D. R. McCLURE, Jr.
RAKE.
APPLICATION FILED APR. 25, 1912.
1,073,771.
Patented Sept. 23, 1913.
2 SHEETS—SHEET 1.
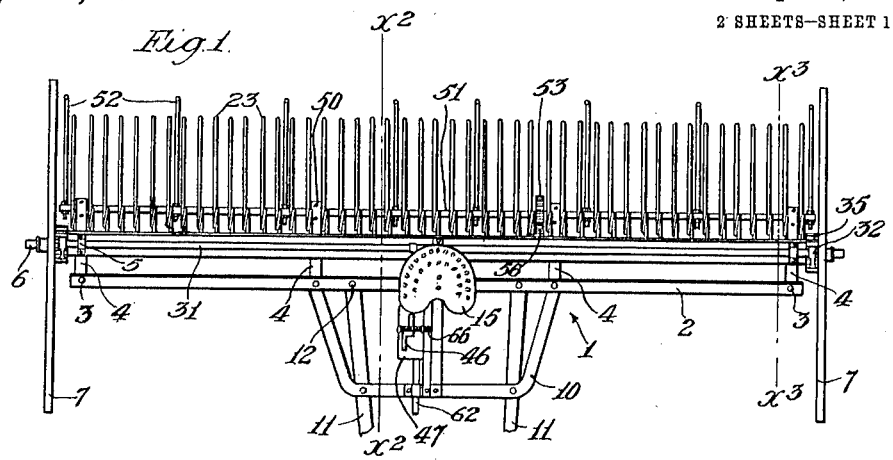
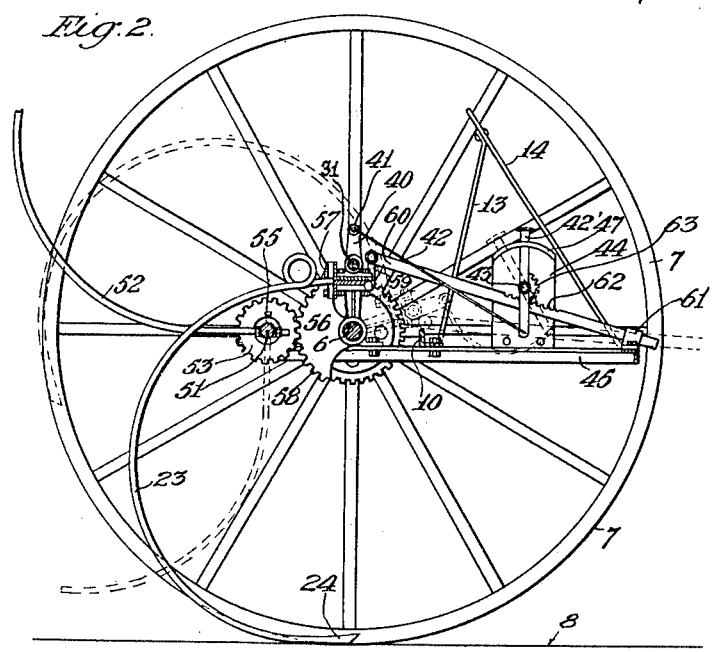
Witnesses:—
Louis W. Gratz.
P. H. Shelton
Inventor
Daniel R. McClure Jr.
his Attorneys.

D. R. McCLURE, Jr.
RAKE.
APPLICATION FILED APR. 25, 1912.
1,073,771.
Patented Sept. 23, 1913.
2 SHEETS—SHEET 2.
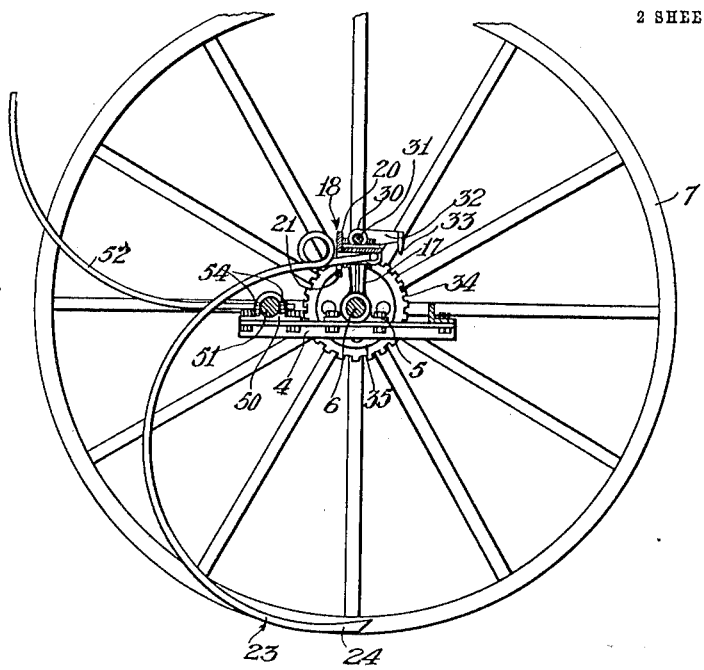
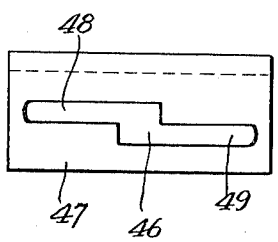
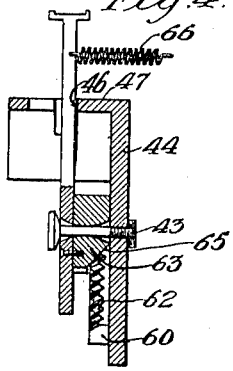
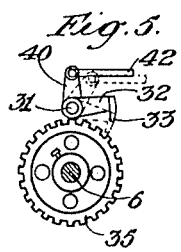
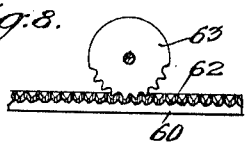
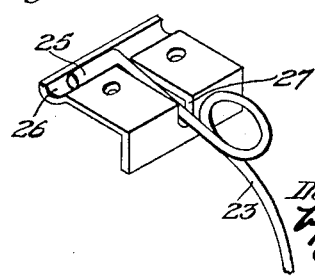
Witnesses:—
Louis W. Gratz
P. H. Shelton
Inventor
Daniel R. McClure Jr.
by
his Attorneys

UNITED STATES PATENT OFFICE.

DANIEL R. McCLURE, JR., OF ARLINGTON STATION, CALIFORNIA, ASSIGNOR OF ONE-HALF TO ARTHUR W. RISHER, OF PASADENA, CALIFORNIA.

RAKE.

1,073,771.   Specification of Letters Patent.   Patented Sept. 23, 1913.

Application filed April 25, 1912.   Serial No. 693,236.

*To all whom it may concern:*

Be it known that I, DANIEL R. McCLURE, Jr., a citizen of the United States, residing at Arlington Station, in the county of Riverside and State of California, have invented a new and useful Rake, of which the following is a specification.

My invention relates to improvements in rakes of the character used in gathering hay in windrows and subsequently bunching the same.

With the common forms of rakes the operation of dumping the hay is comparatively slow, thereby resulting in windrows in which the hay is scattered along each side thereof, and one of the main objects of my invention is to produce a rake of the character described of simple construction in which the hay may be removed from the teeth of the rake rapidly so as to prevent dropping and spreading of the hay at each side of the windrow.

Referring to the drawings, which are for illustrative purposes only: Figure 1 is a plan view of a rake embodying a form of my invention. Fig. 2 is an enlarged, sectional elevation on line $x^2$—$x^2$ Fig. 1. Fig. 3 is an enlarged, sectional elevation on line $x^3$—$x^3$ Fig. 1. Fig. 4 is an enlarged, sectional view showing the foot lever mechanism. Fig. 5 is a detail view, partly in section, showing part of the trip controlling mechanism. Fig. 6 is a plan view of the plate for the foot controlling lever. Fig. 7 is a perspective view, partly in section, showing the manner of mounting the rake teeth. Fig. 8 is a detail, side elevation, partly in section of the rack and segment.

The rake comprises a main frame 1 consisting of a longitudinal member 2, in the present instance an angle bar, to which is secured by means of bolts 3, or other suitable fastening means, a series of rearwardly projecting arms 4, each having mounted thereon a bearing 5 for the purpose of holding an axle shaft 6. Mounted on each end of the shaft 6 is a supporting wheel 7 adapted to run on the ground 8. Extending forwardly from the central portion of the longitudinal member 2 is an extension 10 of the frame to which is secured in any suitable manner a pair of shafts 11, the inner ends of which are fastened to the longitudinal member 2 by means of suitable bolts 12. Extending upwardly from the longitudinal member 2 is a bar 13 secured at its upper end to a bar 14, the lower end of which is secured to the extension 10 and the upper end of which is arranged to support a seat 15 secured thereto in any suitable manner. Pivotally mounted on the shaft 6, by means of standards or brackets 17, is a tooth supporting frame 18 consisting of upper and lower angle bars 20 and 21 respectively secured together in any suitable manner.

23 designates a series of teeth semi-circular in form having a point 24 at the lower end and provided with a lateral extension 25 at the upper end adapted to rest in a longitudinal groove 26 formed in the lower angle bar 21 of the tooth frame 18. The tooth frame 18 is provided with a series of slots 27 transversely disposed therein and adapted to form seats to receive the upper portion of the teeth 23, so as to prevent lateral movement of the teeth, the slots being of sufficient depth to permit a limited free vertical movement of the teeth therein. The upper angle bar 20 being secured to the angle bar 21 engages the off-set end 25 of the respective teeth and thereby prevents a twisting movement of the teeth in the tooth frame.

Mounted on the frame 18 by means of suitable brackets 30 is a trip shaft 31 having mounted thereon at each end a dog 32, the tooth 33 of which is adapted to engage between the teeth 34 of the gear wheel 35 secured to the inner face of the respective wheels 7 for the purposes hereinafter described.

For the purpose of operating the shaft 31 to engage or disengage the dogs 32 thereon from the respective gears 35, an arm 40 is secured to the shaft, the upper end 41 of which is connected by means of a link 42 to the lower end of a foot lever 42' pivotally mounted on a pin 43 in a bracket 44 secured to a cross bar 45 mounted on the extension 10 and the longitudinal member 2 of the main frame 1. The foot lever 42' extends upwardly through a slot 46 formed in a plate 47 which extends outwardly from one side of the bracket 44. The slot 46 consists of a rearwardly extending leg 48 and a forwardly extending leg 49 for the purpose hereinafter described. Mounted on the rear end of each arm 4 is a bracket 50, which brackets 50 support a stripper or cleaner shaft 51, which shaft 51 is mounted in the respective brackets 50 so that the shaft is free to rotate therein.

52 designates a series of strippers or cleaners, each comprising a curved arm or rod which extends rearwardly and upwardly from the shaft 51, the inner end of each rod 52 extending through the shaft 51 and being firmly secured therein by means of suitable nuts 54. Secured to the shaft 51 by means of a set screw 55 is a gear wheel 53 adapted to engage the teeth of a segment 56 which is secured to the tooth frame 18 by means of suitable bolts 57. The teeth 58 of the segment 56 are arranged concentric with the center of the shaft 6 so that the rocking of the tooth frame 18 upon the shaft 6 causes the respective teeth of the segment to mesh with the teeth of the gear 53 during the rocking movement of the tooth frame. Extending upwardly from the tooth frame 18 is a standard 59 to the upper end of which is pivotally connected a rack bar 60, the lower end of which is slidably mounted in a bracket 61 mounted on the forward end of the extension 10. The rack bar 60 is provided in its upper face with a plurality of teeth 62 adapted to be engaged by a segment 63 secured to the inner side of the foot lever 42'.

The rake operates in the following manner: The rake in the form shown is designed to be drawn by a single horse harnessed between the shafts shown. In performing the operation of picking up the cut hay and forming the same in windrows or bunches, the parts of the rake assume the position shown in Fig. 2, in which position the hay is picked up by the points 24 of the teeth and piled up on the rounded portion of the teeth. When it is desired to remove the hay from the teeth, the foot lever 42' is moved rearwardly into the leg 48 of the slot 46 in the plate 47, which movement of the foot lever pulls the arm 40 forwardly by means of the link 42. As the arm 40 is fastened to the shaft 31, the shaft 31 is rotated, thereby bringing the teeth 33 of the dogs 32 into engagement with the respective gear wheels 35, and when so engaged, the gear wheels 35 being fixed to the wheel 7, the shaft is pulled forwardly, thereby causing the tooth frame 18 to swing or rotate forwardly on the shaft 6, thereby raising the teeth upwardly and rearwardly. The forward swinging movement of the frame 18 causes the segment 56 to rotate upwardly, which rotation of the segment 56 causes the gear 53 to rotate, thereby rotating the shaft 51 which swings the strippers or cleaners 52 downwardly during the upward movement of the teeth 23, thereby stripping or cleaning the hay from the teeth 23, which cleaning action is accomplished in a short space of time due to the fact that the teeth 23 are moving upwardly at the same time that the strippers or cleaners 52 are moving downwardly. When the cleaning action has been accomplished, the foot lever 42' is moved forwardly into a central position by means of a spring 66 and the points 24 of the teeth assume the position shown in Fig. 2. If it is desired to hold the points 24 of the teeth firmly against the ground, this may be accomplished by moving the foot lever 42' forwardly into the leg 49 of the slot 46, which operation causes the segment 63 to engage the teeth 62 on the rack bar 60, moving the same rearwardly, which rearward movement of the rack bar swings the tooth frame rearwardly and the points 24 of the teeth downwardly and forwardly, which is desirable in cases where the rake is used for raking up a short stand of hay or other similar crop.

It is readily seen that with a rake constructed as above described, in which the strippers or cleaners are moved downwardly at the same time that the rake teeth are moving upwardly, the action of cleaning the rake teeth is quickly accomplished, thereby producing a clean windrow.

The segment 63 is cut away as indicated at 65 so that the teeth of the segment only mesh with the teeth 62 of the rack 60 when the lever 42' is pushed into the leg 49 of the slot 46, a spring 66 being provided to normally hold the lever 42' in a central position in the slot 46 and out of engagement with the rack 60.

What I claim is:—

1. A rake comprising a frame, a shaft mounted on said frame, a pair of supporting wheels on said shaft, a tooth frame rotatably mounted on said shaft, a series of teeth extending rearwardly and downwardly from said tooth frame, a stripper shaft rotatably mounted on said frame, a series of strippers extending rearwardly from said stripper shaft, a segment fixed to said tooth frame, a gear on said stripper shaft in engagement with said segment, and means for rotating said tooth frame.

2. A rake comprising a frame, a shaft mounted on said frame, a pair of supporting wheels on said shaft, a tooth frame rotatably mounted on said shaft, a series of teeth extending rearwardly and downwardly from said tooth frame, a stripper shaft rotatably mounted on said frame, a series of strippers mounted on said stripper shaft and extending rearwardly therefrom, a segment fixed to said tooth frame, a gear on said stripper shaft in engagement with said segment, means for rotating said tooth frame, said means comprising a trip shaft mounted on said tooth frame, a dog on each end of said trip shaft, a gear secured to each first named wheel, and means for engaging and disengaging said dogs from the respective last named gears.

3. A rake comprising a frame, a shaft mounted on said frame, a pair of supporting wheels on said shaft, a tooth frame rotatably mounted on said shaft, a series of teeth extending rearwardly and downwardly from said tooth frame, a stripper shaft rotatably mounted on said frame, a series of strippers mounted on said stripper shaft and extending rearwardly therefrom, a segment fixed to said tooth frame, a gear on said stripper shaft in engagement with said segment, means for rotating said tooth frame, said means comprising a trip shaft mounted on said tooth frame, a dog on each end of said trip shaft, a gear secured to each first named wheel, an arm fixed on said trip shaft, a pivotally mounted foot lever, and a link connecting said arm and said lever.

4. A rake comprising a frame, a shaft mounted on said frame, a pair of supporting wheels on said shaft, a tooth frame rotatably mounted on said shaft, a series of teeth extending rearwardly and downwardly from said tooth frame, a stripper shaft rotatably mounted on said frame, a series of strippers mounted on said stripper shaft and extending rearwardly therefrom, a segment fixed to said tooth frame, a gear on said stripper shaft in engagement with said segment, means for rotating said tooth frame, said means comprising a trip shaft mounted on said tooth frame, a dog on each end of said trip shaft, a gear secured to each first named wheel, means for engaging and disengaging said dogs from the respective last named gears, means for positively pushing said teeth downwardly, said means consisting of a rack bar connected to said tooth frame, a segment adapted to engage the teeth on said rack bar, and means for operating said segment to move said rack bar.

In testimony whereof, I have hereunto set my hand at Riverside, California, this 15th day of April, 1912.

DANIEL R. McCLURE, Jr.

In presence of—
SAML. H. EBBERTS,
ROBT. M. McCLURE.

Copies of this patent may be obtained for five cents each, by addressing the "Commissioner of Patents, Washington, D. C."